(12) United States Patent
Choi

(10) Patent No.: US 11,970,226 B2
(45) Date of Patent: Apr. 30, 2024

(54) ELASTIC CRAWLER

(71) Applicant: Yong Jae Choi, Daejeon (KR)

(72) Inventor: Yong Jae Choi, Daejeon (KR)

( * ) Notice: Subject to any disclaimer, the term of this patent is extended or adjusted under 35 U.S.C. 154(b) by 514 days.

(21) Appl. No.: 17/092,745

(22) Filed: Nov. 9, 2020

(65) Prior Publication Data

US 2021/0147013 A1 May 20, 2021

(30) Foreign Application Priority Data

Nov. 18, 2019 (JP) .................................. 2019-207963
Oct. 23, 2020 (KR) ........................ 10-2020-0138328

(51) Int. Cl.
*B62D 55/24* (2006.01)

(52) U.S. Cl.
CPC .................. *B62D 55/244* (2013.01)

(58) Field of Classification Search
CPC ..... B62D 55/24; B62D 55/244; B62D 55/253
USPC ......................................................... 305/167
See application file for complete search history.

(56) References Cited

U.S. PATENT DOCUMENTS

| | | | | |
|---|---|---|---|---|
| 5,380,076 A * | 1/1995 | Hori | ...................... | B62D 55/244 305/193 |
| 7,044,567 B2 * | 5/2006 | Ishibashi | .............. | B62D 55/244 305/167 |
| 7,300,119 B2 * | 11/2007 | Ueno | ...................... | B62D 55/24 305/165 |
| 2008/0007118 A1 * | 1/2008 | Fujita | ................... | B62D 55/244 305/170 |
| 2012/0032502 A1 * | 2/2012 | Shimozono | .......... | B62D 55/244 305/169 |
| 2012/0146401 A1 * | 6/2012 | Shimozono | .......... | B62D 55/244 305/169 |
| 2014/0001829 A1 * | 1/2014 | Uchiyama | ............ | B62D 55/244 305/167 |
| 2018/0194409 A1 * | 7/2018 | Tateishi | ............... | B62D 55/244 |
| 2018/0201335 A1 * | 7/2018 | Nam | .................... | B62D 55/244 |

FOREIGN PATENT DOCUMENTS

| | | | | |
|---|---|---|---|---|
| JP | 2002-255066 A | | 9/2002 | |
| JP | 2003-089366 A | | 3/2003 | |
| JP | 2010-012806 A | | 1/2010 | |
| JP | 2010-120549 A | | 6/2010 | |
| JP | 2010-120550 A | | 6/2010 | |
| JP | 2010120549 A | * | 6/2010 | |
| JP | 2011-046276 A | | 3/2011 | |
| JP | 2018-144633 A | | 9/2018 | |
| WO | WO-2011024841 A1 | * | 3/2011 | ........... B62D 55/244 |

* cited by examiner

*Primary Examiner* — S. Joseph Morano
*Assistant Examiner* — Eva L Comino
(74) *Attorney, Agent, or Firm* — Harvest IP Law, LLP

(57) ABSTRACT

An elastic crawler capable of effectively preventing an occurrence of vibration, noise and cracks during driving while improving durability is provided. The elastic crawler includes a coupling portion arranged at equal intervals in a circumferential direction at a center in a left and right direction of a crawler body, a steel core arranged in the left and right direction between adjacent coupling portions in the circumferential direction of the crawler body, and two rows of left and right lugs installed on an outer periphery of the crawler body, wherein each of the rows of the lugs includes driving lugs arranged in an oblique direction with respect to the steel core, and each of the driving lugs overlaps with two adjacent steel cores in the circumferential direction.

13 Claims, 19 Drawing Sheets

ELASTIC CRAWLER

CROSS-REFERENCE TO RELATED APPLICATIONS

This application claims priority from Japanese Patent Application No. 2019-207963 filed on Nov. 18, 2019 in the Japan Patent Office, and Korean Patent Application No. 10-2020-0138328 filed on Oct. 23, 2020 in the Korea Patent Office, the disclosures of which are incorporated herein by reference in their entireties.

BACKGROUND

1. Technical Field

Apparatuses and methods consistent with exemplary embodiments relate to an elastic crawler, and more particularly, to an elastic crawler used in machinery equipment such as transport trucks, agricultural machinery, snow plows, or construction machinery.

2. Description of the Related Art

Generally, an elastic crawler used in machinery equipment such as a transport vehicle has a crawler body made of an elastic material such as rubber. A large number of coupling holes are formed at equal intervals in a circumferential direction at approximately a center in a left and right direction of the crawler body. In addition, a steel core in the left and right direction (i.e., width direction) is buried in the crawler body between the coupling holes. Further, two rows of left and right lugs are arranged on an outer periphery of the crawler body.

In order to reduce vibration during driving and to prevent cracking of the crawler body, the elastic crawler includes a driving lug arranged in an oblique shape with respect to each steel core in the crawler body in two rows of left and right lugs, and a connecting lug connecting the driving lugs adjacent in the circumferential direction, in which each row of lugs is composed of a continuous shape in the circumferential direction.

In two rows of left and right lugs of a related art elastic crawler, driving lugs and connecting lugs are continuous in the circumferential direction. Therefore, compared to a gap between lugs in the circumferential direction, an occurrence of vibration and cracking is less. However, the driving lugs and a steel core of each lug row are arranged so that each driving lug overlaps each steel core at one place. Therefore, when driving on a road, a surface pressure of the overlapped portion of the driving lug with the steel core increases. Accordingly, durability decreases, and the occurrence of vibration noise during driving cannot be sufficiently prevented.

In other words, during driving, driving wheels, flow rotating wheels, etc. are connected to the crawler body to guide the crawler body in a forward and backward direction and in the circumferential direction while rolling relatively. However, each driving lug is overlapped at one place for each steel core, and an area of an overlapping portion is small. Therefore, when the driving lug contacts a road surface, a surface pressure of the overlapped portion of the driving lug with the steel core is increased, and the drive lug is liable to be damaged in the overlapping portion. In other words, the durability of the driving lugs is reduced.

In addition, if a hard material to withstand a high surface pressure of the overlapping portion is selected as an elastic material of the crawler body including the driving lugs, each steel core hits the road surface in an overlapped portion of a narrow area where the hard drive lugs are driven on the road surface when driving on the road surface, and vibration and noise during driving increase.

Further, because the area of the overlapping portion between each driving lug and each steel core is small, the crawler body may be bent greatly on both sides of the overlapping portion while driving, causing cracks in the crawler body itself.

SUMMARY

Aspects of one or more exemplary embodiments provide an elastic crawler capable of effectively preventing the occurrence of vibration, noise and cracks during driving while improving durability.

Additional aspects will be set forth in part in the description which follows and, in part, will become more apparent from the description, or may be learned by practice of the exemplary embodiments.

According to an aspect of an exemplary embodiment, there is provided an elastic crawler including: a coupling portion arranged at equal intervals in a circumferential direction at a center in a left and right direction of a crawler body, a steel core arranged in the left and right direction between adjacent coupling portions in the circumferential direction of the crawler body, and two rows of left and right lugs installed on an outer periphery of the crawler body, wherein each of the two rows of lugs includes driving lugs arranged in an oblique direction with respect to the steel core, and each of the driving lugs overlaps with two adjacent steel cores in the circumferential direction.

An inner end side of two driving lugs adjacent in the circumferential direction may be positioned on one side of the two adjacent steel cores in the circumferential direction, and an outer end side thereof may be positioned on the other side of the two adjacent steel cores.

Each of the driving lugs may protrude forward in a forward direction and be curved in an arc shape.

Each of the driving lugs may protrude rearward in a forward direction and be curved in an arc shape.

Each of the driving lugs may have a substantially straight shape.

Each of the two rows of left and right lugs may include a connecting lug configured to connect two adjacent driving lugs in the circumferential direction.

An upper surface of the connecting lug is lower than an upper surface of a connecting lug corresponding portion of the driving lug corresponding to the connecting lug.

According to one or more exemplary embodiments, in addition to improving durability, it is possible to effectively prevent the occurrence of vibration, noise, and cracks during driving.

BRIEF DESCRIPTION OF THE DRAWINGS

The above and other aspects and features will become more apparent from the following description of the exemplary embodiments with reference to the accompanying drawings, in which.

DETAILED DESCRIPTION

Figure 1:
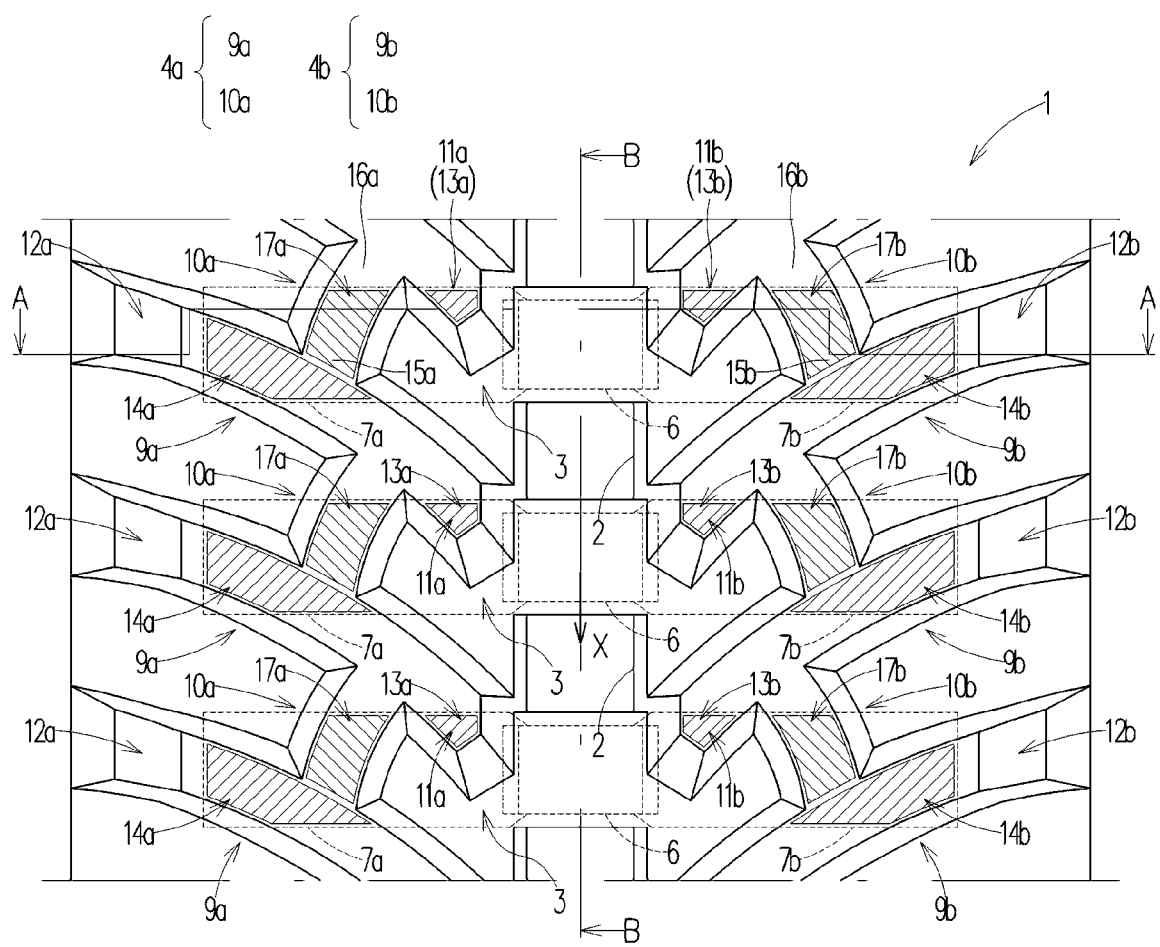
FIG. 1 is a plan view showing an elastic crawler according to a first exemplary embodiment.
Figure 2:
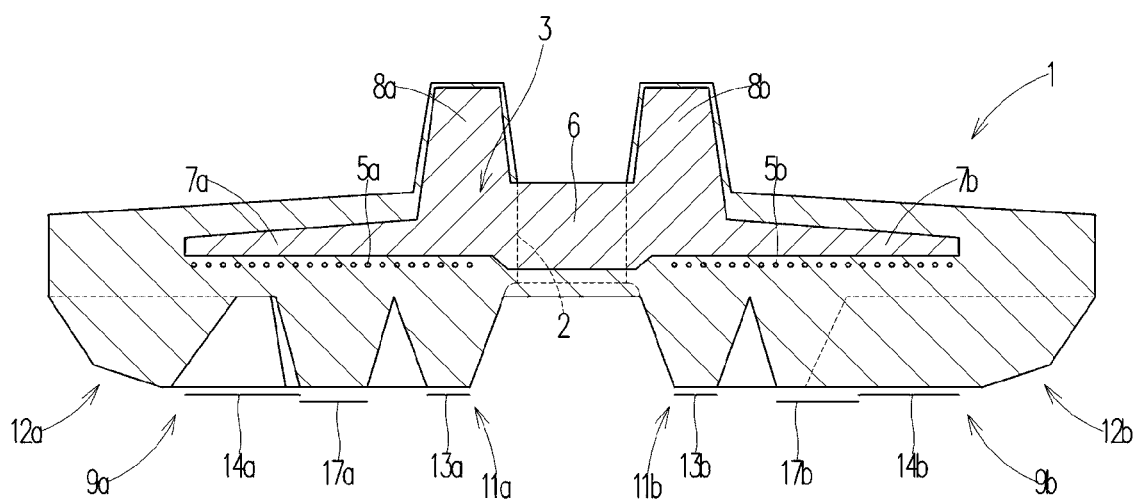
FIG. 2 is a cross-sectional view taken along line A-A of FIG. 1.
Figure 3:
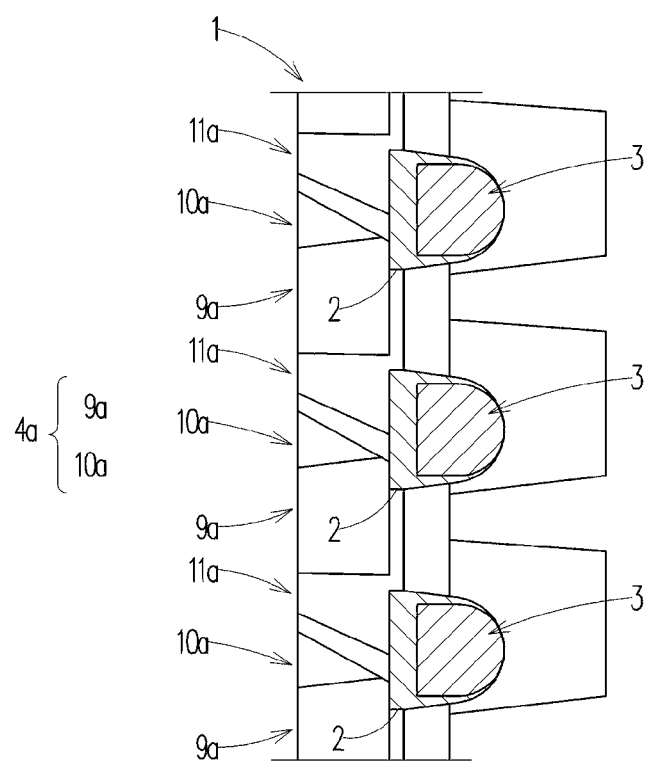
FIG. 3 is a cross-sectional view taken along line B-B of FIG. 1.
Figure 4:
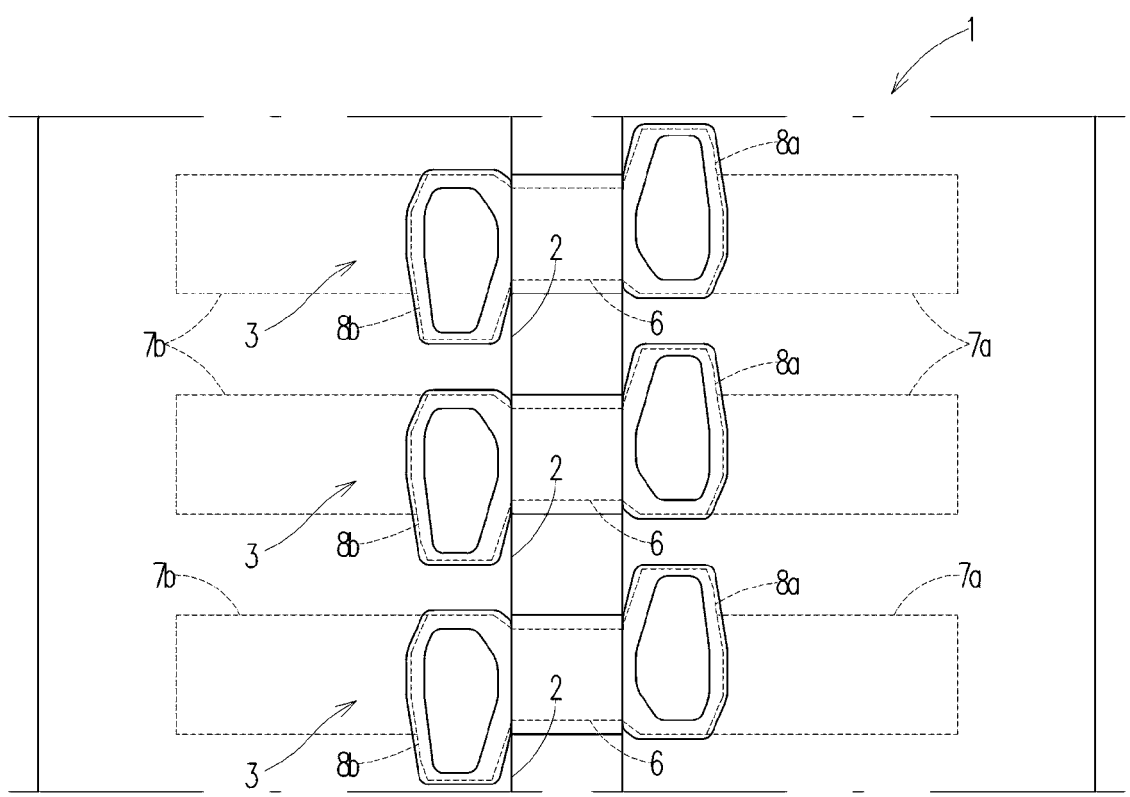
FIG. 4 is a bottom view showing the elastic crawler according to the first exemplary embodiment.

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

Hereinafter, when it is considered that the detailed description for the related known art may blur the gist of the exemplary embodiments, detailed descriptions of parts thereof will be omitted. In the description with reference to the accompanying drawings, the same or corresponding components are assigned to the same reference numbers regardless of drawing numbers, and redundant description thereof will be omitted.

FIGS. 1 to 4 show an elastic crawler according to a first exemplary embodiment.

Referring to FIGS. 1 to 4, the elastic crawler according to the first exemplary embodiment includes a crawler body 1 made of an elastic material such as rubber, a coupling hole 2 for driving wheels arranged at equal intervals in a circumferential direction at approximately a center in a left and right direction of the crawler body 1 and arranged in a row shape, a steel core 3 arranged in the left and right direction between each coupling hole 2 in the crawler body 1, and two rows of left and right lugs 4 *a* and 4 *b* arranged on both left and right sides of the coupling hole 2 on an outer periphery of the crawler body 1, in which the elastic crawler is wound around a driving wheel, a driven wheel, a flow rotating wheel, etc.

A plurality of tension members 5a and 5b such as steel wires are embedded in the left and right direction in the crawler body 1. A coupling protrusion of the driving wheel is coupled to the coupling hole 2. A plurality of coupling holes 2 are installed in a row shape with approximately equal intervals in the circumferential direction at the approximately center in the left and right direction of the crawler body 1.

The steel core 3 integrally includes a coupling portion 6 positioned in the center in the left and right direction of the crawler body 1, wings 7a and 7b extending from both sides of the coupling portion 6 to an outer side in the left and right direction of the crawler body 1, and guide protrusions 8a and 8b protruding from both sides of the coupling portion 6 to an inner circumferential side of the crawler body 1. The crawler body 1 includes a coupling hole 2 between the coupling portion 6 of the steel core 3, in which the coupling protrusion on an outer periphery of the driving wheel is configured to be coupled from an inside of the coupling hole 2 to the coupling portion 6.

The left and right two rows of lugs 4a and 4b are arranged symmetrically on both sides in the left and right direction of the crawler body 1, in which a plurality of driving lugs 9a and 9b and connecting lugs 10a and 10b are alternately arranged in the circumferential direction in each of the lug rows 4a and 4b. As shown in FIG. 1, the left and right driving lugs 9a and 9b and the connecting lugs 10a and 10b are arranged bisymmetrically with a same pitch in the circumferential direction. In addition, the driving lugs 9a and 9b and the connecting lugs 10a and 10b have a trapezoidal cross section, protrudes outward from an outer circumferential surface of the crawler body 1, and top surfaces thereof are approximately the same height.

Each of the left and right driving lugs 9a and 9b has an arc shape gently curved between inner ends 11a and 11b of the center in the left and right direction of the crawler body 1, and outer ends 12a and 12b of outer sides in the left and right direction. Each of the left and right driving lugs 9a and 9b is arranged in an inclined shape in an oblique direction with respect to a line in the circumferential direction and the left and right direction of the crawler body 1, so that the inner ends 11a and 11b are positioned on the steel core 3 in a forward direction (i.e., in a direction of an arrow X in FIG. 1) of the two adjacent steel cores 3 in the circumferential direction, and the outer ends 12a and 12b are positioned on an outer extension of the steel core 3 in a backward direction of the two adjacent steel cores 3 in the circumferential direction.

In other words, the driving lugs 9a and 9b are formed in a gentle arc shape that expands backward in the forward direction from the inner ends 11a and 11b toward the outer ends 12a and 12b, and are arranged in a generally inclined shape with respect to the steel core 3. As shown by an oblique line in FIG. 1, in the driving lugs 9a and 9b, the inner ends 11a and 11b overlap with the steel core 3 in front of the crawler body 1 in the forward direction and front overlapping portions 13a and 13b, and a middle portion inside the outer ends 12a and 12b overlaps the steel core 3 at a rear at rear overlapping portions 14a and 14b. In addition, the inner ends 11a and 11b sides of the driving lugs 9a and 9b are arranged to face each other left and right on both sides of the coupling hole 2, and the outer ends 12a and 12b are arranged on both the left and right sides of the crawler body 1.

Each of the connecting lugs 10a and 10b connects the driving lugs 9a and 9b adjacent to each other in the circumferential direction, and is curved in a gentle arc shape that expands outward in the left and right direction of the crawler body 1, as shown in FIG. 1. Among front connecting portions 15a and 15b and rear connecting portions 16a and 16b at both ends of each connecting lug 10a and 10b, the front connecting portions 15a and 15b at the front in the forward direction of the crawler body 1 are integrally connected to the driving lugs 9a and 9b at the front in the middle in the left and right direction, and the rear connecting portions 16a and 16b at the rear in the forward direction are integrally connected to the driving lugs 9a and 9b at the rear inward in the left and right direction than the front connecting portions 15a and 15b. Accordingly, both of the front and rear sides of each of the connecting lugs 10a and 10b are arranged at a substantially right angle or an angle close to a substantially right angle with respect to the driving lugs 9a and 9b.

As shown by the diagonal line in FIG. 1, in many of the connecting lugs 10a and 10b, all connecting portions 15a and 15b are included. The steel core 3 is overlapped at overlapping portions 17a and 17b. The rear connecting portions 16a and 16b of each of the connecting lugs 10a and 10b are arranged at an intermediate position between the adjacent steel cores 3 without overlapping with the front and rear steel cores 3.

In addition, both connecting lugs 10a and 10b in the circumferential direction are connected to the drive lugs 9a and 9b, in which the rear connecting portions 16a and 16b are positioned inside the left and right direction, and the front connecting portions 15a and 15b are positioned outside the left and right direction. The overlapping state of the front connecting portions 15a and 15b and the rear connecting portions 16a and 16b with the steel core 3 may be reversed.

In the elastic crawler, the crawler body 1 rotates in the circumferential direction along each driving wheel. Therefore, during the rotational motion, the driving wheels or the like relatively pass through each of the steel cores 3. Accordingly, when the crawler body 1 rotates in the forward direction while driving on a road surface, whenever each steel core 3 corresponds to the road surface by the rotational motion of the crawler body 1, by a load applied through the steel core 3 or the like, the driving lugs 9a and 9b are sequentially pressed against the road surface and move in the forward and backward direction.

In the elastic crawler of the exemplary embodiment, for each of the left and right lug rows 4a and 4b, two driving lugs 9a and 9b adjacent in the circumferential direction are arranged in an inclined shape with respect to the two steel core 3 adjacent in the circumferential direction, and each steel core 3 is overlapped by the front overlapping portions 13a and 13b and the rear overlapping portions 14a and 14b, respectively. Therefore, whenever each steel core 3 corresponds to the road surface, two driving lugs, front and rear of the driving lugs 9a and 9b in the front and in the rear of the rotation direction are overlapped on the steel core 3. In addition, the overlapping portions of the connecting lugs 10a and 10b between the driving lugs 9a and 9b are also in a state overlapped with the steel core 3.

Because the driving lugs 9a, 9b and the steel core 3 overlap at two places: the front overlapping portions 13a and 13b and the rear overlapping portions 14a and 14b, compared to the related art elastic crawler overlapping the steel core in one place, it is possible to enlarge areas of the overlapping portions 13a, 13b, 14a, and 14b. In addition, when the driving lugs 9a and 9b contact the road surface, it is possible to lower a surface pressure of the overlapping portions of the driving lugs 9a and 9b. As a result, each driving lug 9a and 9b rolls on the road surface with the low surface pressure. In addition, the durability of driving lugs 9a and 9 is improved. Further, it is possible to suppress vibration and running noise (e.g., rolling sound) in which the drive lugs 9a and 9b hit the road surface during driving.

In addition, the two driving lugs 9a and 9b adjacent in the circumferential direction are overlapped with respect to the two steel cores 3 adjacent in the circumferential direction, and there are two driving lugs 9a and 9b adjacent in the circumferential direction by straddling two adjacent steel cores 3 in the circumferential direction. Therefore, the crawler body 1 is not extremely bent between two steel core metals 3 adjacent in the circumferential direction. Further, it is possible to prevent an occurrence of cracks or the like in the crawler body 1 on both sides of each steel core 3.

In addition, the connecting lugs 10a and 10b connecting between the driving lugs 9a and 9b also have an overlapping portion with the steel core 3. Therefore, for each steel core 3, in each of the lug rows 4a and 4b, there are overlapping portions of the lugs 9a, 9b, 10a, and 10b in three places in total. Therefore, it is possible to lower the surface pressure of the entire lugs 9a, 9b, 10a, and 10b.

Figure 5:
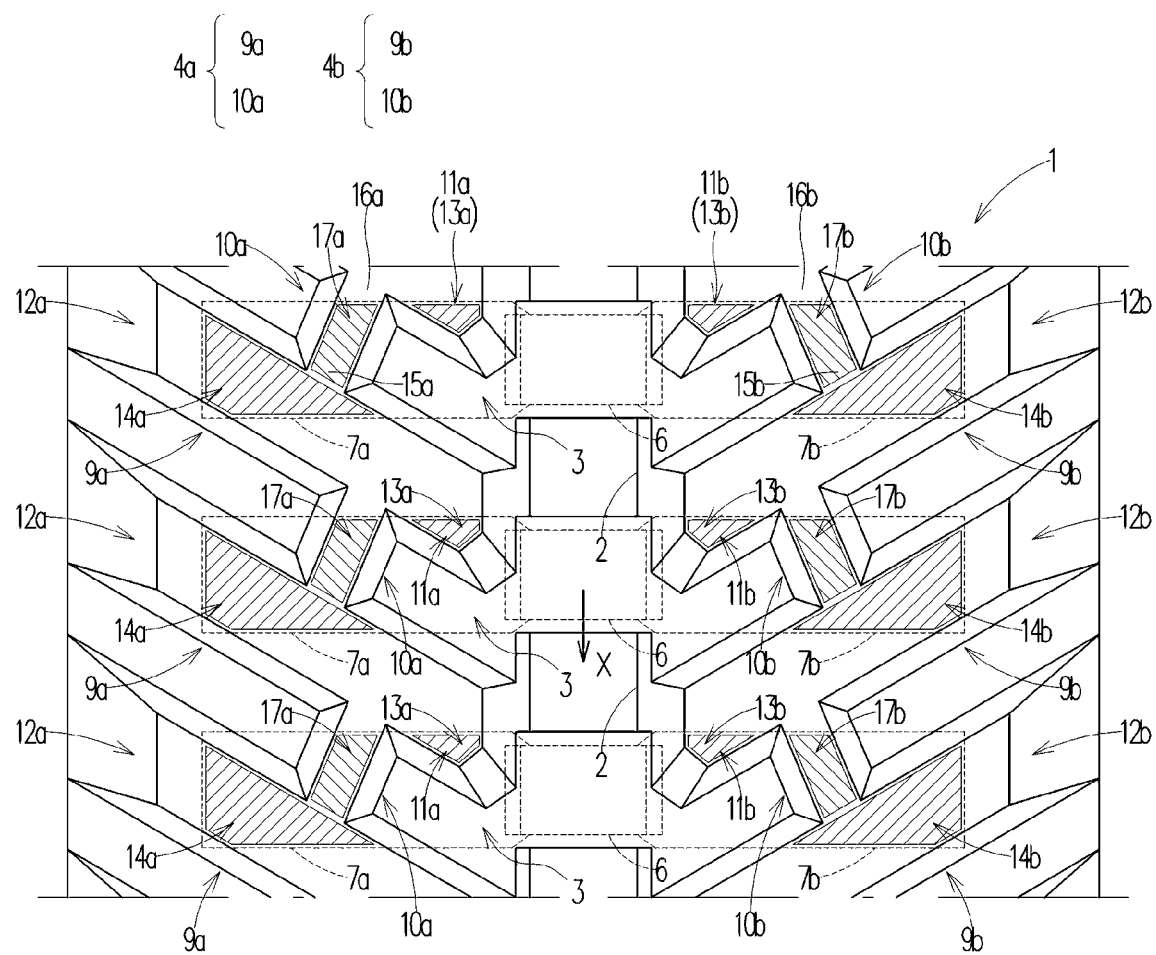
FIG. 5 is a plan view showing an elastic crawler according to a second exemplary embodiment.

FIG. 5 illustrates an elastic crawler according to a second exemplary embodiment. Referring to FIG. 5, the elastic crawler has left and right lug rows 4a and 4b, in which driving lugs 9a and 9b and connecting lugs 10a and 10b of each of the lug rows 4a and 4b are installed in a substantially linear shape. Here, other configurations may be implemented in the same manner as in the first exemplary embodiment, so detailed descriptions are omitted.

In this way, it is also possible to configure the driving lugs 9a and 9b and the connecting lugs 10a and 10b of the left and right lug rows 4a and 4b in a substantially linear shape. Even in the case of employing the driving lugs 9a and 9b and the connecting lugs 10a and 10b having such a configuration, it is possible to overlap the driving lugs 9a and 9b on the steel core 3 at the two overlapping portions 13a, 13b, 14a, and 14b, and to overlap the connecting lugs 10a and 10b on the steel core 3 at the overlapping portions 17a and 17b, respectively.

Therefore, it is possible to improve the durability of the driving lugs 9a and 9b by lowering the surface pressure of the driving lugs 9a and 9b. Moreover, vibration during driving may be prevented. In addition, it is possible to prevent occurrence of cracks in the crawler body 1.

Figure 6:
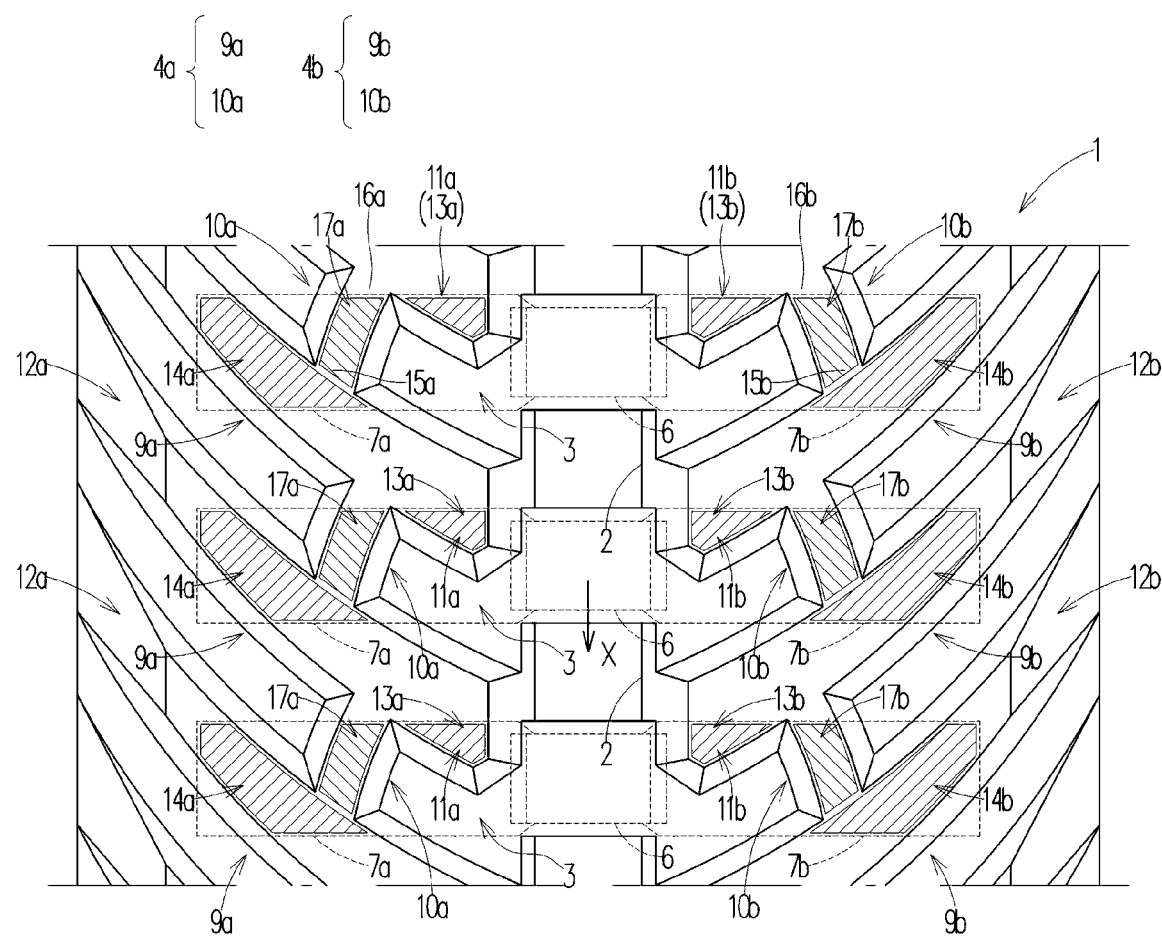
FIG. 6 is a plan view showing an elastic crawler according to a third exemplary embodiment.

FIG. 6 illustrates an elastic crawler according to a third exemplary embodiment. Referring to FIG. 6, the elastic crawler has left and right lug rows 4a and 4b, in which driving lugs 9a and 9b and connecting lugs 10a and 10b of each of the lug rows 4a and 4b are curved in an arc shape.

Each of the driving lugs 9a and 9b is curved in an arc shape that expands forward in the forward direction between inner ends 11a and 11b and outer ends 12a and 12b, and overlaps with a steel core 3 at overlapping portions 13a, 13b, 14a, and 14b. Almost all of the connecting lugs 10a and 10b overlap the steel core 3 at overlapping portions 17a and 17b. Here, other configurations may be implemented in the same manner as in the first exemplary embodiment, so detailed descriptions are omitted.

In the elastic crawler, the driving lugs 9a and 9b are curved in an arc shape, but compared with the driving lugs 9a and 9b of the first exemplary embodiment, a curvature direction is reversed. However, even in this case, it is possible to overlap the driving lugs 9a and 9b on the steel core 3 at the two overlapping portions 13a, 13b, 14a, and 14*b*, and to overlap the connecting lugs 10*a* and 10*b* on the steel core 3 at the overlapping portions 17*a* and 17*b*, respectively.

Therefore, it is possible to improve the durability of the driving lugs 9*a* and 9*b* by lowering the surface pressure of the driving lugs 9*a* and 9*b*. Moreover, vibration during driving may be prevented. In addition, it is possible to prevent occurrence of cracks in the crawler body 1.

Figure 7:
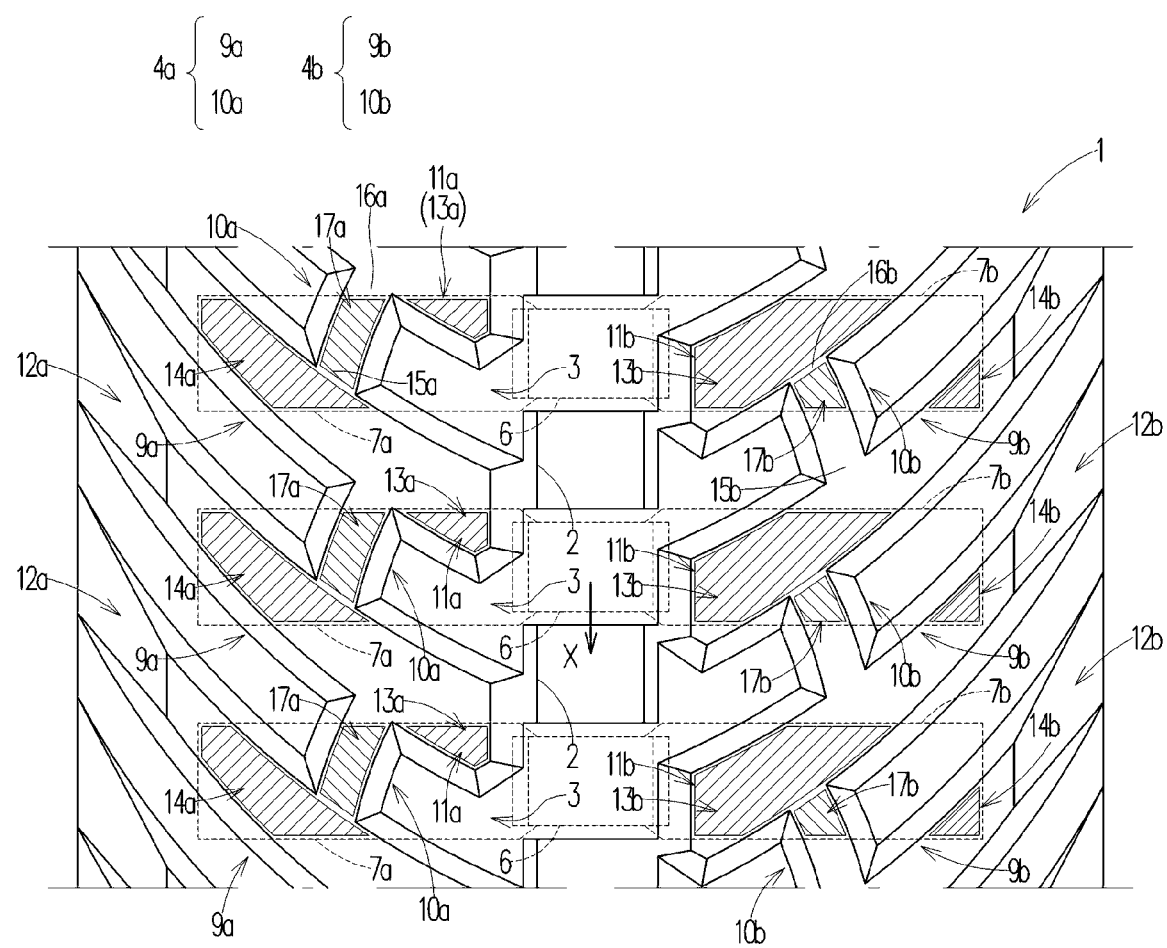
FIG. 7 is a plan view showing an elastic crawler according to a fourth exemplary embodiment.

FIG. 7 illustrates an elastic crawler according to a fourth exemplary embodiment. Referring to FIG. 7, the elastic crawler is provided with left and right lug rows 4*a* and 4*b*. Each of the left and right lug rows 4*a* and 4*b* is provided with driving lugs 9*a* and 9*b* and connecting lugs 10*a* and 10*b* that are curved in an arc shape, in which the driving lugs 9*a* and 9*b* and the connecting lugs 10*a* and 10*b* of each of the left and right lug rows 4*a* and 4*b* are arranged in a state shifted by half a pitch in a circumferential direction of a crawler body 1.

The driving lugs 9*a* and 9*b* of each of the left and right lug rows 4*a* and 4*b* are overlapped with respect to each steel core 3 at two overlapping portions 13*a*, 13*b*, 14*a*, and 14*b*, and the connecting lugs 10*a* and 10*b* are overlapped with respect to each steel core 3 at one overlapping portion 17*a* and 17*b*. Here, other configurations may be implemented in the same manner as in the first exemplary embodiment, so detailed descriptions are omitted.

In this way, even when the driving lugs 9*a* and 9*b* and the connecting lugs 10*a* and 10*b* of the left and right lug rows 4*a* and 4*b* are arranged to be shifted by half a pitch in the circumferential direction of the crawler body 1, it is possible to overlap the driving lugs 9*a* and 9*b* on the steel core 3 at the two overlapping portions 13*a*, 13*b*, 14*a*, and 14*b*, and to overlap the connecting lugs 10*a* and 10*b* on the steel core 3 at the overlapping portions 17*a* and 17*b*, respectively. Therefore, it is possible to improve the durability of the driving lugs 9*a* and 9*b* by lowering the surface pressure of the driving lugs 9*a* and 9*b*. Moreover, vibration during driving may be prevented. In addition, it is possible to prevent occurrence of cracks in the crawler body 1.

Figure 8:
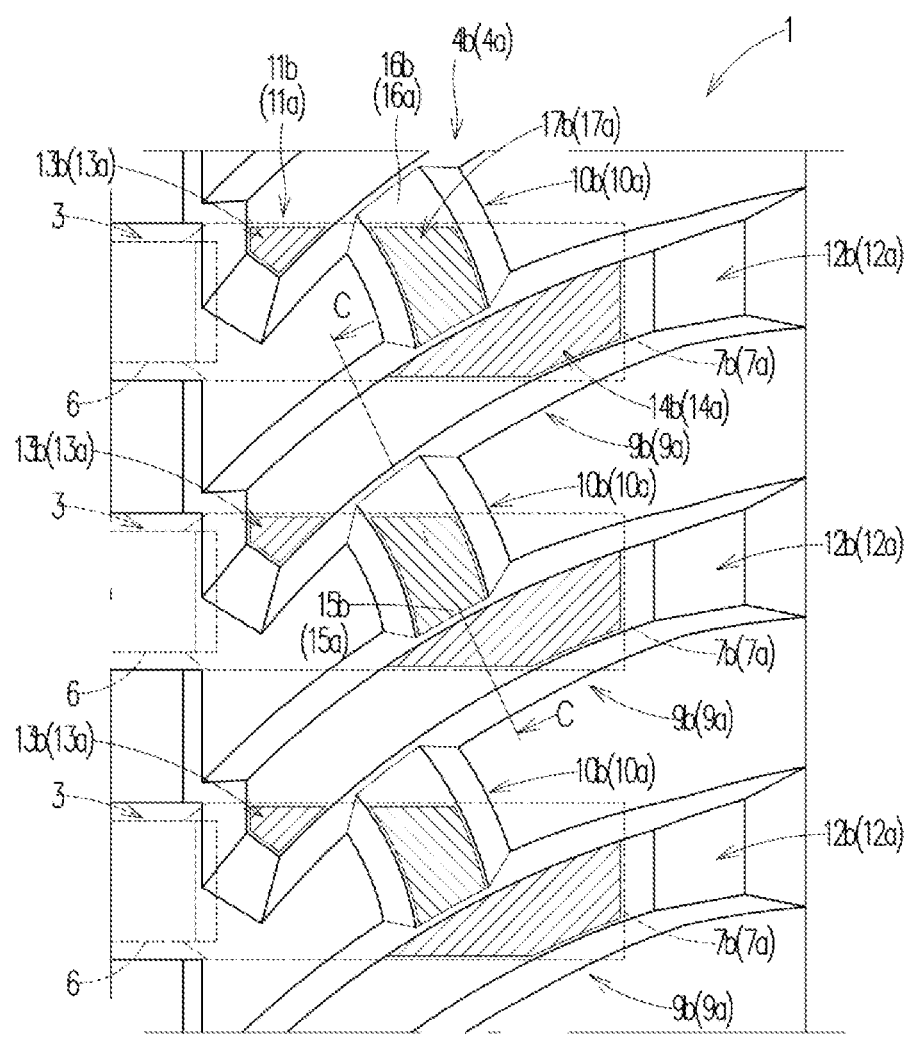
FIG. 8 is a plan view showing an elastic crawler according to a fifth exemplary embodiment.
Figure 9:
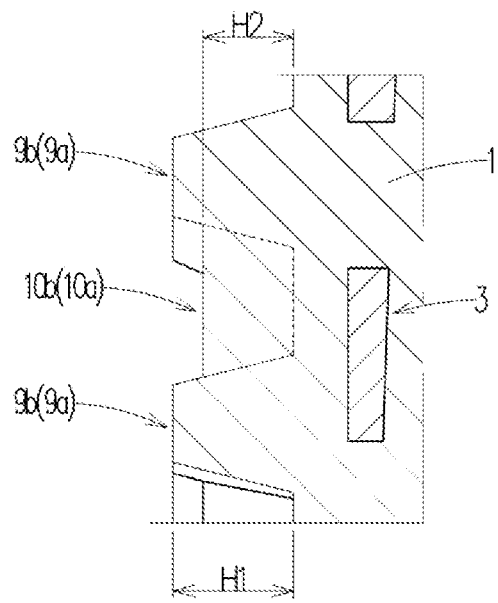
FIG. 9 is a cross-sectional view taken along line C-C of FIG. 8.

FIGS. 8 and 9 illustrate an elastic crawler according to a fifth exemplary embodiment. Referring to FIGS. 8 and 9, inside driving lugs 9*a* and 9*b* and connecting lugs 10*a* and 10*b* constituting left and right lug rows 4*a* and 4*b*, an upper surface height H1 of driving lugs 9*a* and 9*b* are higher than an upper surface height H2 of the connecting lugs 10*a* and 10*b*. Here, other configurations may be implemented in the same manner as in the exemplary embodiments, so detailed descriptions are omitted.

In this way, by configuring the upper surface height H1 of the driving lugs 9*a* and 9*b* higher than the upper surface height H2 of the connecting lugs 10*a* and 10*b*, even when driving in an unstopped place, it is possible to prevent slipping of the driving lugs 9*a* and 9*b* at portions corresponding to the connecting lugs 10*a* and 10*b*. In addition, an erosion of the driving lugs 9*a* and 9*b* on the ground is improved.

In other words, when the upper surface heights of the driving lugs 9*a* and 9*b* and the connecting lugs 10*a* and 10*b* are approximately the same, a slip is likely to occur between a portion of the driving lugs 9*a* and 9*b* corresponding to the connecting lugs 10*a* and 10*b* and the ground. In addition, the erosion of the driving lugs 9*a* and 9*b* on the ground becomes worse.

However, if the upper surface height H1 of the driving lugs 9*a* and 9*b* is higher than the upper surface height H2 of the connecting lugs 10*a* and 10*b*, the driving lugs also protrude from the portions corresponding to the connecting lugs 10*a* and 10*b*. Therefore, the sliding between the driving lugs 9*a* and 9*b* and the ground is reduced, and the erosion of the driving lugs 9*a* and 9*b* on the ground is improved.

Figure 10:
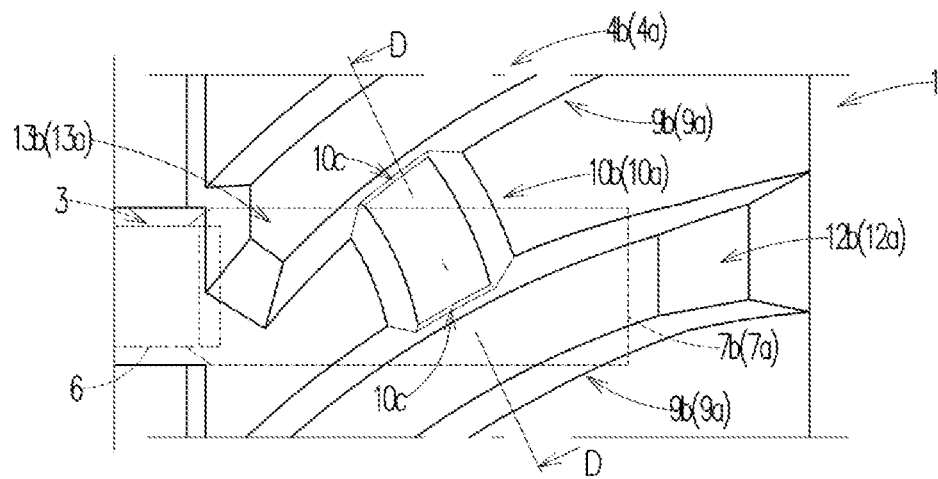
FIG. 10 is a plan view showing an elastic crawler according to a sixth exemplary embodiment.
Figure 11:
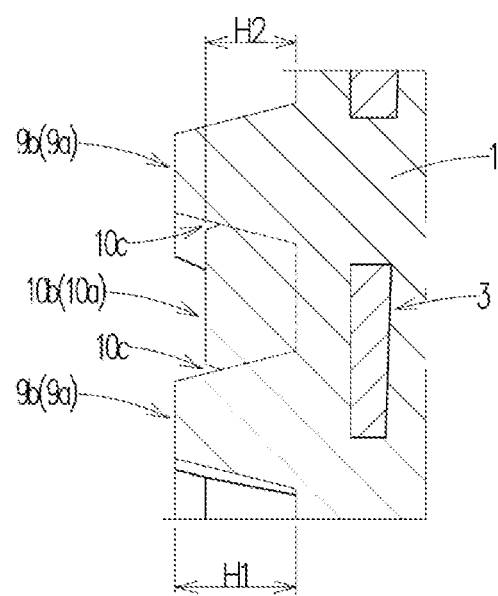
FIG. 11 is a cross-sectional view taken along line D-D of FIG. 10.

FIGS. 10 and 11 illustrate an elastic crawler according to a sixth exemplary embodiment. Referring to FIGS. 10 and 11, when the upper surface height H1 of the driving lugs 9*a* and 9*b* is configured higher than the upper surface height H2 of the connecting lugs 10*a* and 10*b*, it is also possible to provide a "V" shape or other recessed portions 10*c* on the drive lugs 9*a* and 9*b* at both ends of the connecting lugs 10*a* and 10*b*, so that a boundary between the driving lugs 9*a* and 9*b* and the connecting lugs 10*a* and 10*b* becomes prominent.

Figure 12:
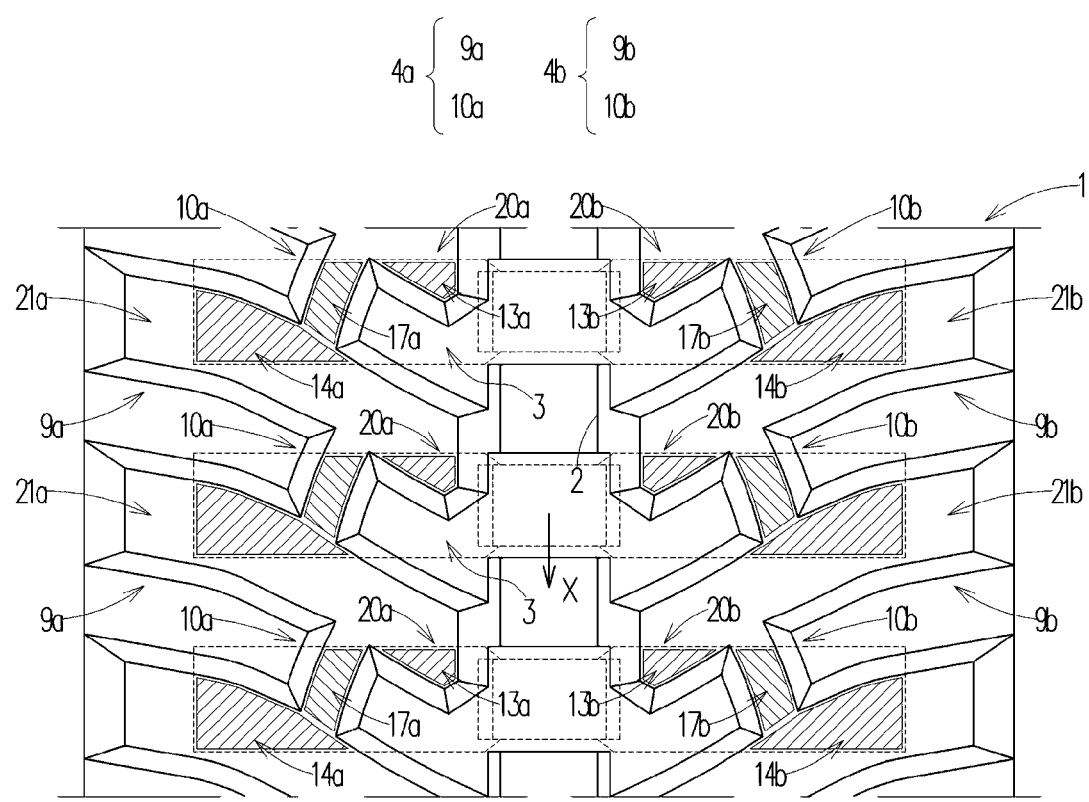
FIG. 12 is a plan view showing an elastic crawler according to a seventh exemplary embodiment.

FIG. 12 illustrates an elastic crawler according to a seventh exemplary embodiment. Referring to FIG. 12, left and right two rows of lug rows 4*a* and 4*b* include driving lugs 9*a* and 9*b* and connecting lugs 10*a* and 10*b*, in which the driving lugs 9*a* and 9*b* are generally inclined with respect to a steel core 3. Here, in inner portion 20*a* and 20*b* and outer portion 21*a* and 21*b*, there is a difference in an angle with respect to the steel core 3.

In other words, when a lug shape viewed from a plane of the driving lugs 9*a* and 9*b* is configured as shown in FIG. 12, it is possible to prevent a driving force at the time of advancing and retreating of the elastic crawler from being extremely different. For example, when the driving lugs 9*a* and 9*b* are configured in an arc shape as shown in FIG. 6 or 7, angles of the driving lugs 9*a* and 9*b* with respect to the steel core 3 are larger at both ends compared to the center of the crawler body 1 in the left and right direction.

As a result, in driving a place that does not stop, when the crawler body 1 rotates in a forward direction (i.e., arrow X direction), in left and right portions of the crawler body 1, soil is guided and moved to both left and right along the curved shape of the driving lugs 9*a* and 9*b*, and an erosion force of the driving lugs 9*a* and 9*b* on the ground is reduced.

When the crawler body 1 rotates in a retracting direction, soil of the left and right ends of the crawler body 1 is guided toward the center of the left and right direction along the curved shape of the driving lugs 9*a* and 9*b*. Therefore, the erosion force of the driving lugs 9*a* and 9*b* on the ground is improved. As a result, there is a large difference in driving force when moving forward and when retreating.

However, as shown in FIG. 12, by configuring the driving lugs 9*a* and 9*b* to be bent in the middle so that the inner portions 20*a* and 20*b* and the outer portions 21*a* and 21*b* become "L" shape, it is possible to prevent the driving force when moving forward and retreating from being extremely different.

Figure 13:
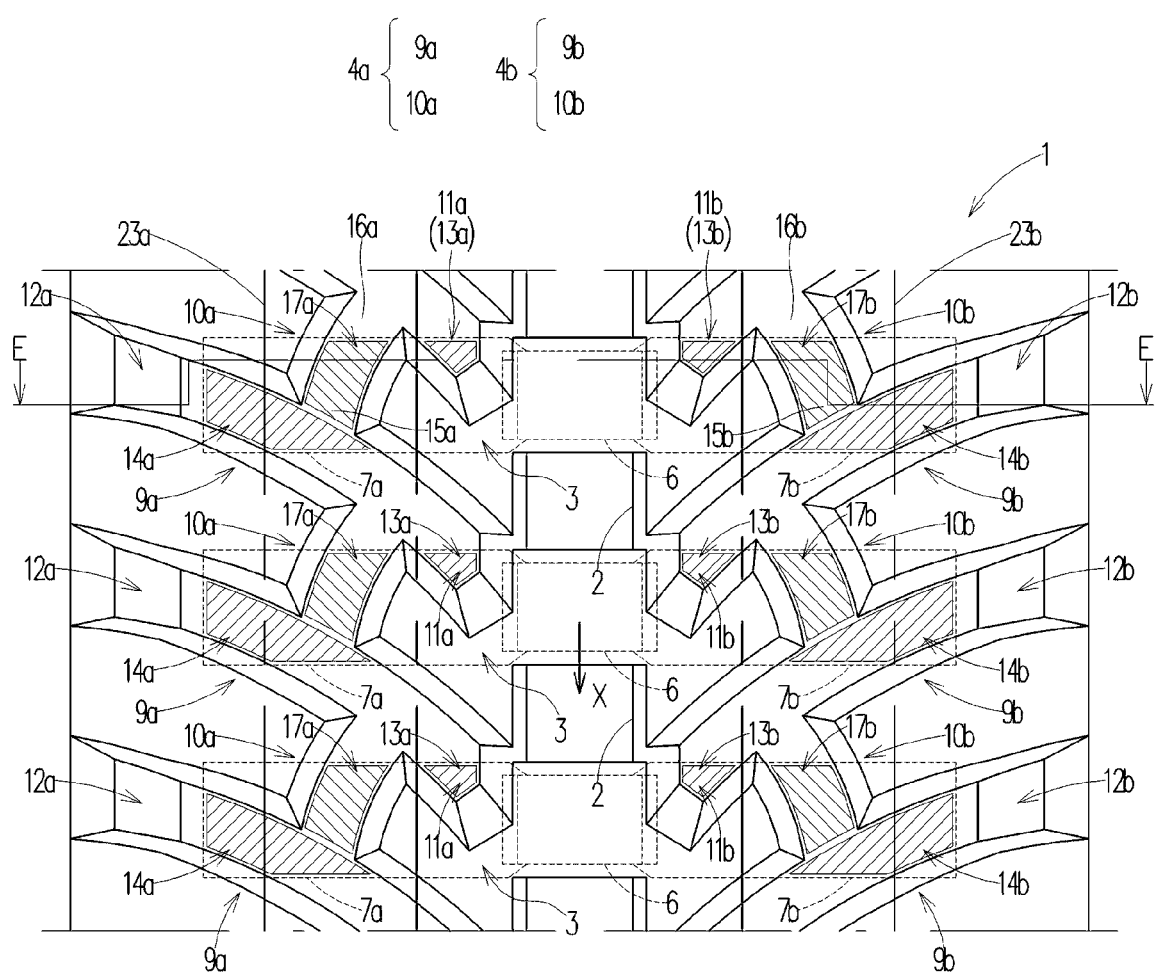
FIG. 13 is a plan view showing an elastic crawler according to an eighth exemplary embodiment.
Figure 14:
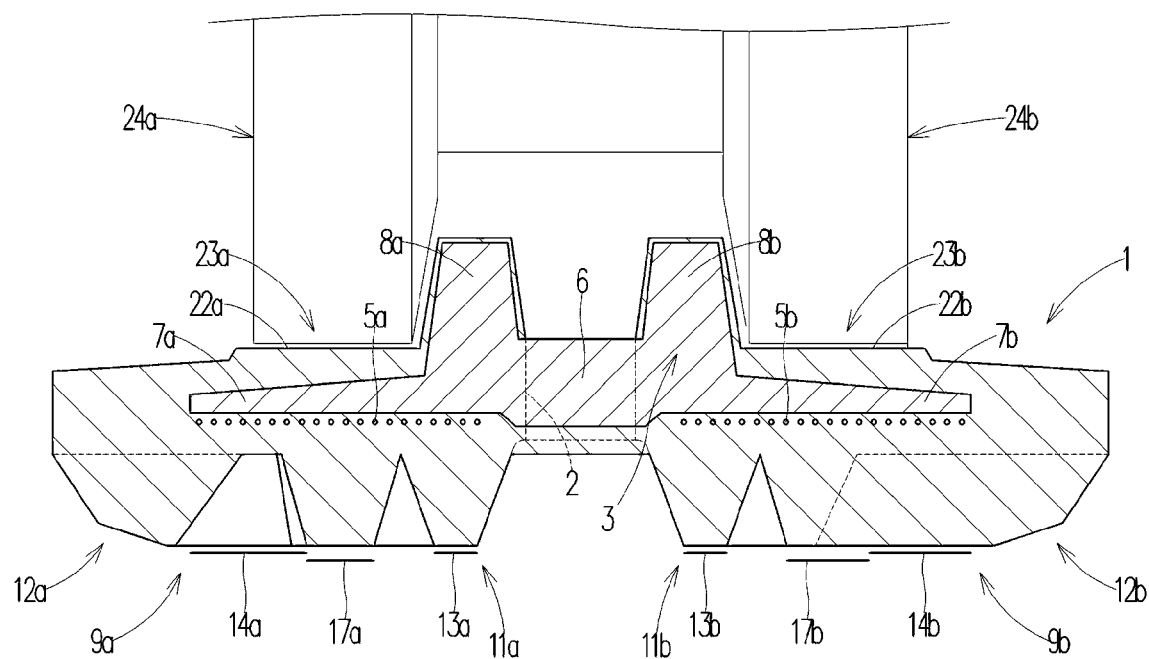
FIG. 14 is a cross-sectional view taken along line E-E in FIG. 13.

FIGS. 13 and 14 illustrate an elastic crawler according to an eighth exemplary embodiment. Referring to FIGS. 13 and 14, driving lugs 9*a* and 9*b* and connecting lugs 10*a* and 10*b* are installed on an outer periphery of the crawler body 1, and wheel rolling portions 22*a* and 22*b* are provided on an inner periphery of the crawler body 1. Because the driving lugs 9*a* and 9*b* and the connecting lugs 10*a* and 10*b* may be implemented in the same configuration as in the first exemplary embodiment, detailed descriptions are omitted.

In the wheel rolling portions 22*a* and 22*b*, wheel rolling paths 23*a* and 23*b* are configured in which the wheels 24*a* and 24*b* are rolled with a driving wheel, a driven wheel, a flow rotating wheel, etc. during the rotational movement of the crawler body 1, and it is arranged in a column shape in the circumferential direction corresponding to the connecting lugs 10*a* and 10*b* outside left and right guide projections 8*a* and 8*b*.

As such, it is also possible to provide the wheel rolling portions 22*a* and 22*b* corresponding to the connecting lugs 10*a* and 10*b* on the outer periphery side on the inner periphery of the crawler body 1. By this, it is possible to prevent as much as possible vertical vibration of the crawler body 1 when the wheels 24*a* and 24*b* roll the wheel rolling paths 23*a* and 23*b*.

Figure 15:
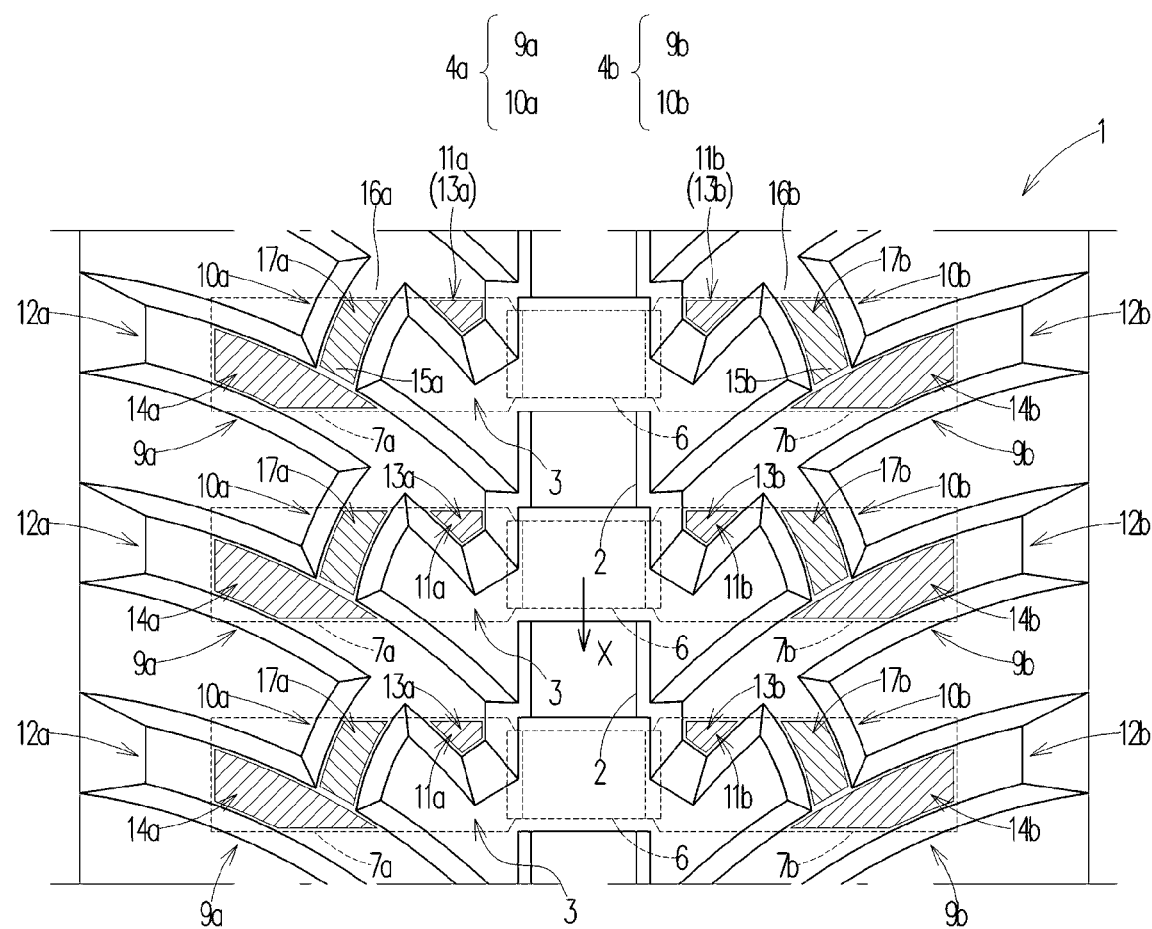
FIG. 15 is a plan view showing an elastic crawler according to a ninth exemplary embodiment.
Figure 16:
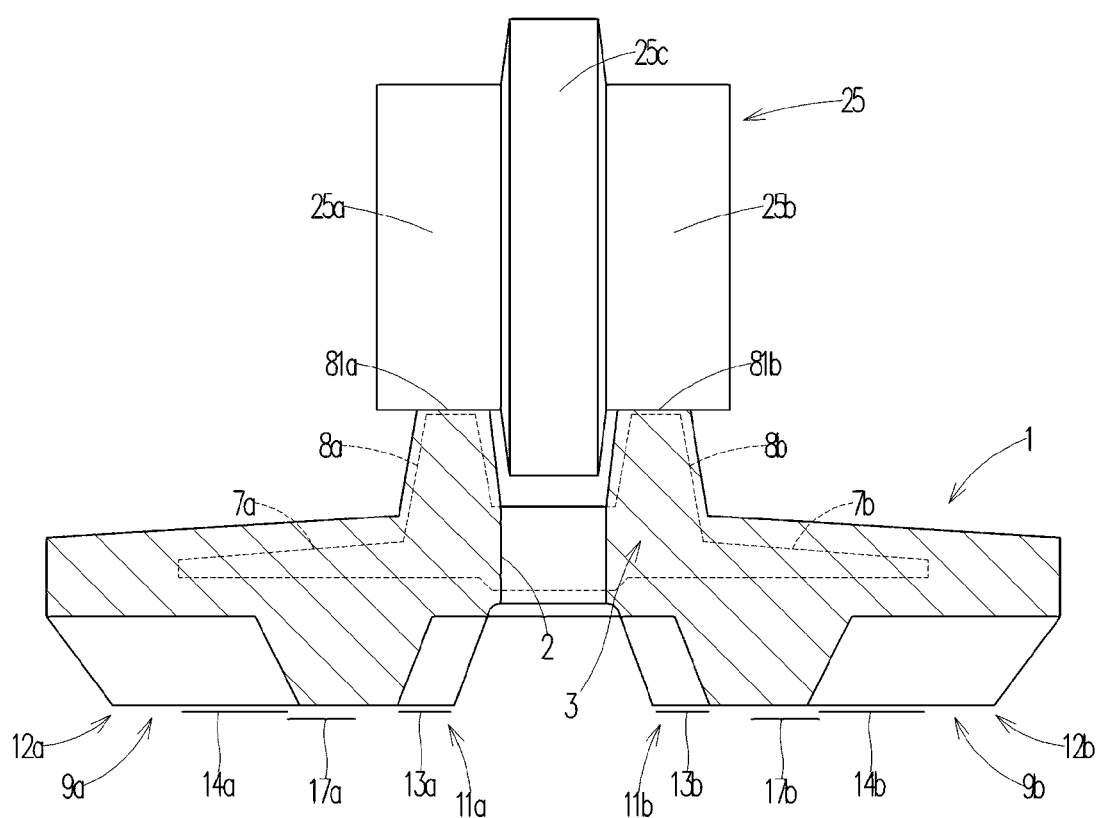
FIG. 16 is a bottom view showing the elastic crawler according to the ninth exemplary embodiment.
Figure 17:
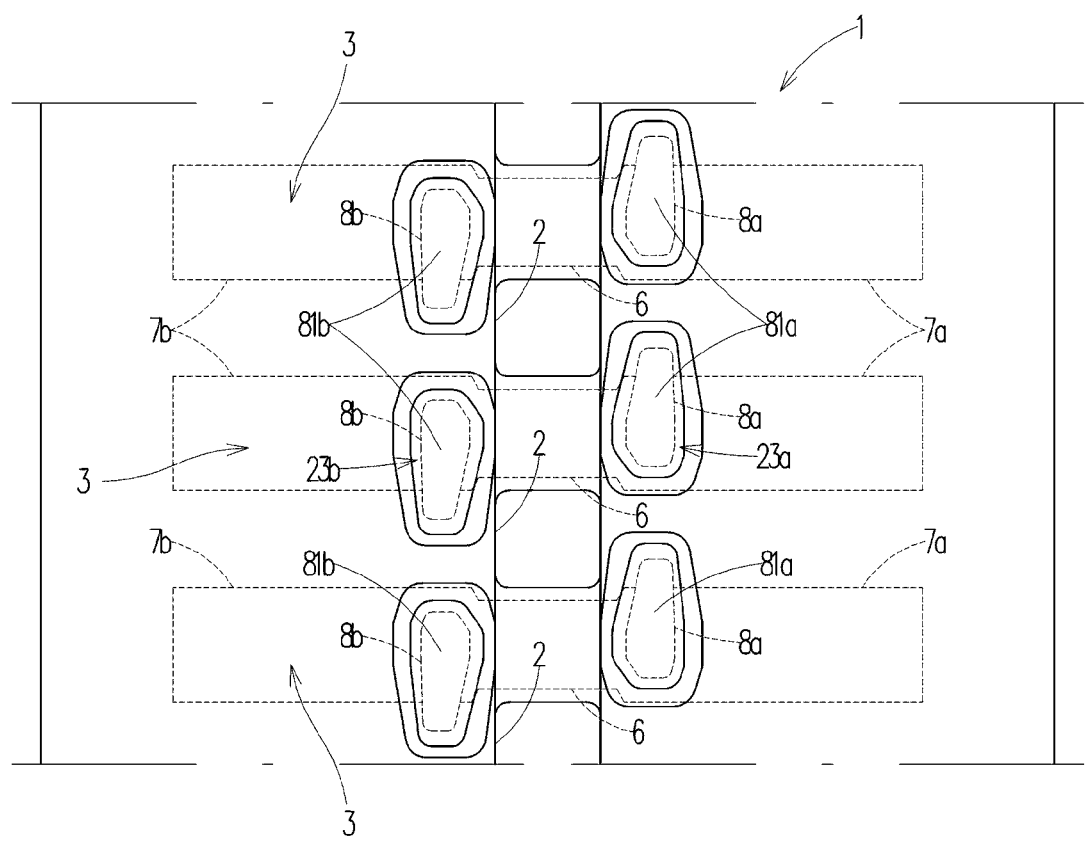
FIG. 17 is a cross-sectional view showing the elastic crawler according to the ninth exemplary embodiment.

FIGS. 15 to 17 illustrate an elastic crawler according to a ninth exemplary embodiment. Referring to FIGS. 15 and 16, driving lugs 9*a* and 9*b* and connecting lugs 10*a* and 10*b* are installed on an outer periphery of a crawler body 1. Because these may be implemented in the same configuration as in the first exemplary embodiment, detailed descriptions are omitted.

Referring to FIGS. 16 and 17, a pair of left and right guide protrusions 8*a* and 8*b* of a steel core 3 protrude on an inner periphery of the crawler body 1. Each of the guide protrusions 8*a* and 8*b* has head portions 81*a* and 81*b* elongated in the circumferential direction (i.e., front and rear direction). In the head portions 81*a* and 81*b*, wheel rolling paths 23*a* and 23*b* through which a flow rotating wheels 25 roll are formed. The head portions 81*a* and 81*b* of each guide protrusion 8*a* and 8*b* protrude from the steel core 3 in the opposite direction of the circumferential direction. The flow rotating wheel 25 has a pair of left and right small-diameter rotating wheel portions 25*a* and 25*b* for rolling the head portions 81*a* and 81*b* of the guide projections 8*a* and 8*b*, and a large-diameter guided portion 25*c* arranged between the pair of rotating wheel portions 25*a* and 25*b* and guided by inner portions of the guide projections 8*a* and 8*b*.

In this way, even in the elastic crawler in which the flow rotating wheel 25 is rolling over the head portions 81*a* and 81*b* of the guide protrusions 8*a* and 8*b*, it is possible to improve the durability of the driving lugs 9*a* and 9*b* by reducing a surface pressure of the driving lugs 9*a* and 9*b*. In addition, vibration during driving may be prevented, and it is possible to prevent the occurrence of cracks in the crawler body 1.

Figure 18:
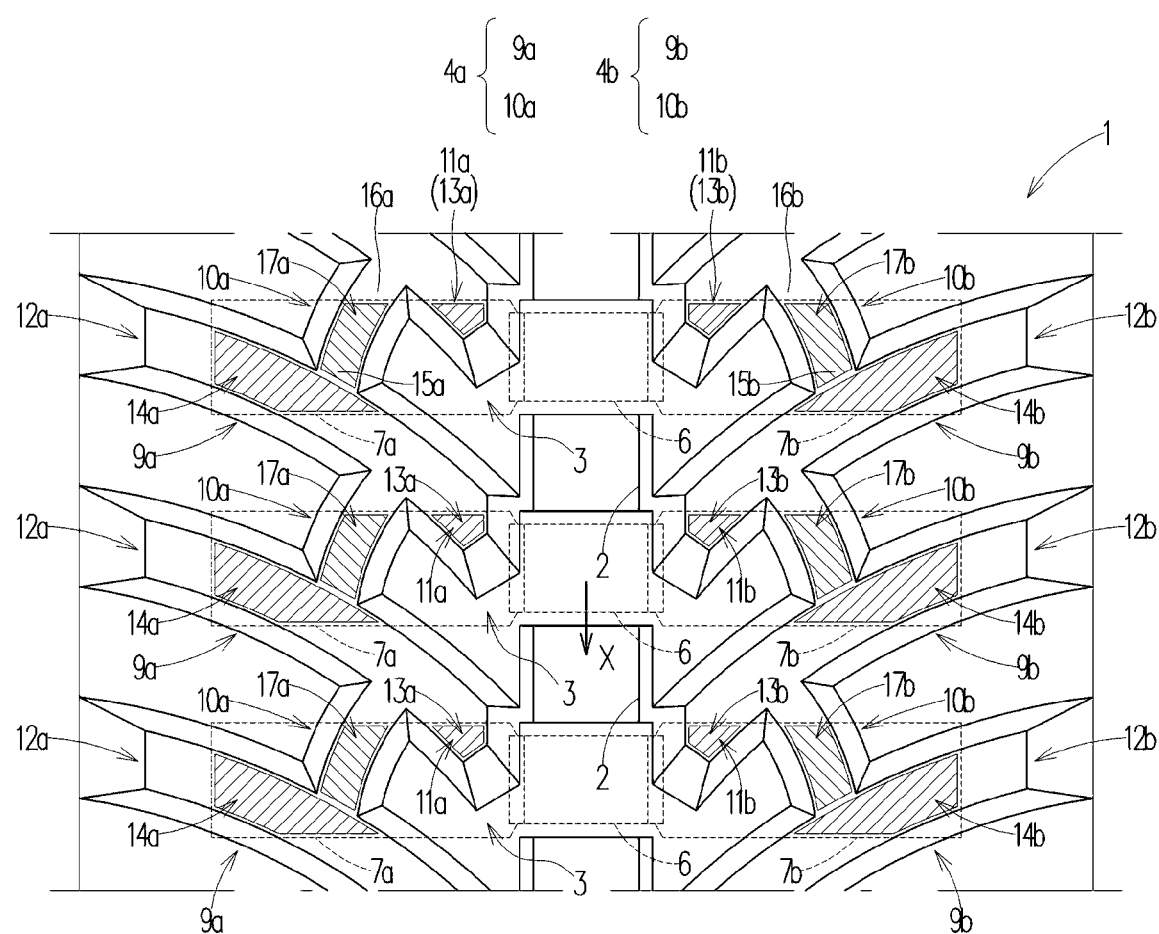
FIG. 18 is a plan view showing an elastic crawler according to a tenth exemplary embodiment.
Figure 19:
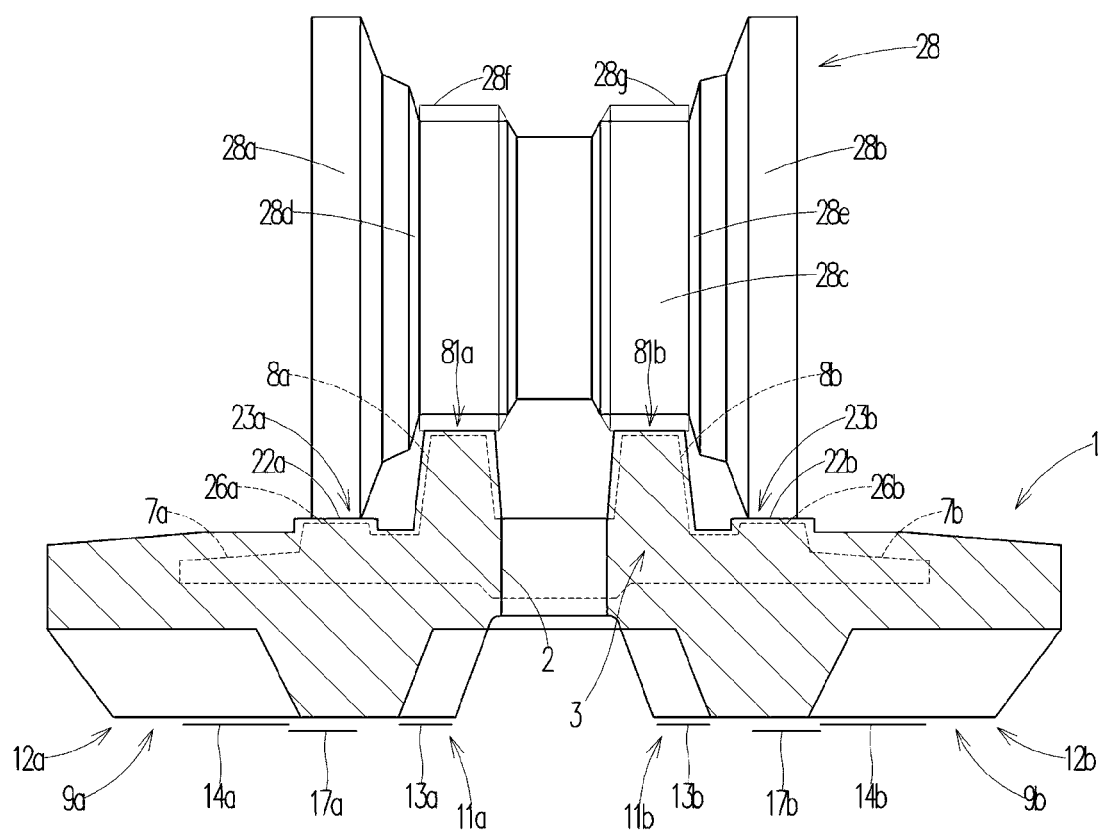
FIG. 19 is a bottom view showing the elastic crawler according to the tenth exemplary embodiment.
Figure 20:
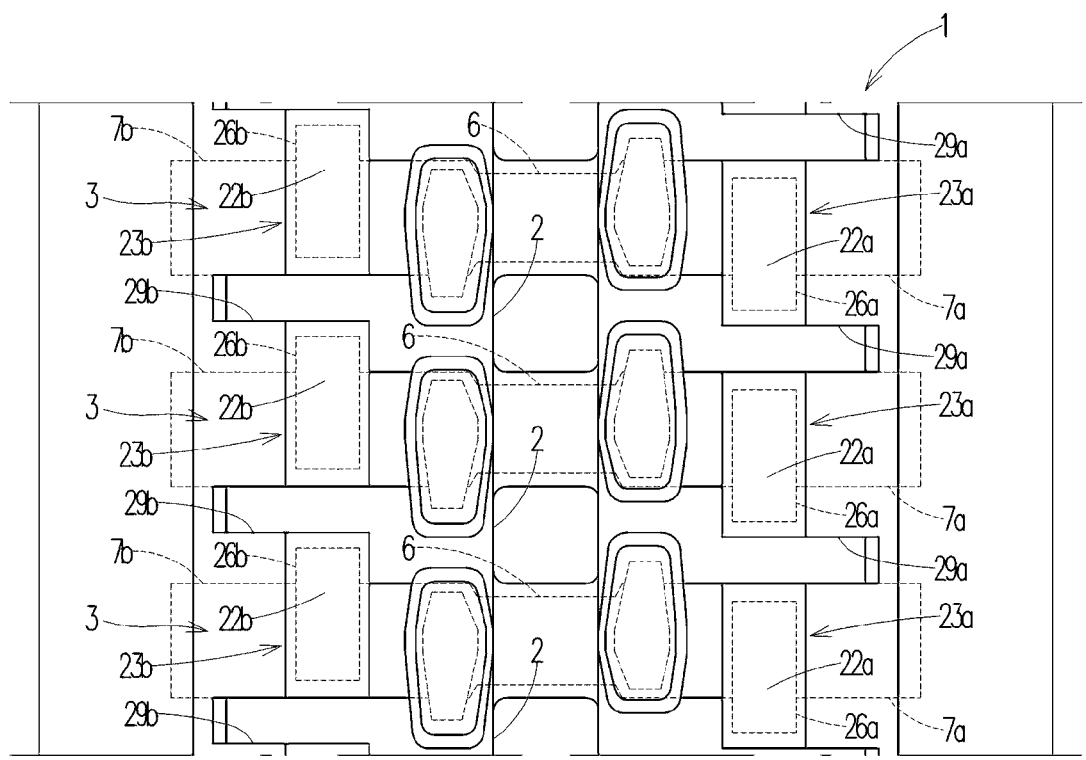
FIG. 20 is a cross-sectional view showing the elastic crawler according to the tenth exemplary embodiment.

FIGS. 18 to 20 illustrate an elastic crawler according to a tenth exemplary embodiment. Referring to FIGS. 18 and 19, driving lugs 9*a* and 9*b* and connecting lugs 10*a* and 10*b* are installed on an outer periphery of a crawler body 1. Because these may be implemented in the same configuration as in the first exemplary embodiment, detailed descriptions are omitted.

Referring to FIGS. 19 and 20, a pair of left and right guide protrusions 8*a* and 8*b* of a steel core 3, and wheel rolling portions 26*a* and 26*b* arranged outside the guide protrusions 8*a* and 8*b* are installed on an inner periphery of the crawler body 1. The guide protrusions 8*a* and 8*b* and the wheel rolling portions 26*a* and 26*b* are formed to be elongated in the circumferential direction (i.e., front and rear direction). In addition, the guide protrusions 8*a* and 8*b* and the wheel rolling portions 26*a* and 26*b* protrude from the left and right sides in the opposite direction to the circumferential direction with respect to the steel core 3. In addition, the left and right guide projections 8*a* and 8*b* and the left and right wheel rolling portions 26*a* and 26*b* are point symmetric for each steel core 3.

In the wheel rolling portions 26*a* and 26*b*, large-diameter rotating wheel portions 28*a* and 28*b* of a flow rotating wheel 28 constitute wheel rolling paths 23*a* and 23*b* for rolling. Recessed portions 29*a* and 29*b* are provided in the left and right direction between the wheel rolling portions 26*a* and 26*b* adjacent in the circumferential direction to improve the flexibility of the crawler body 1. The flow rotating wheel 28 includes large-diameter rotating wheel portions 28*a* and 28*b* formed on both left and right ends and capable of rolling over the wheel rolling portions 26*a* and 26*b*, a small-diameter portion 28*c* corresponding to the guide projections 8*a* and 8*b*, and inclined portions 28*d*, 28*e* formed between the rotating wheel portions 28*a* and 28*b* and the small-diameter portion 28*c* and whose positions in the left and right direction are regulated by outer edge portions of the guide projections 8*a* and 8*b*. The wheel rolling paths 23*a* and 23*b* correspond to the connecting lugs 10*a* and 10*b*.

In the elastic crawler including the flow rotating wheel 28, it is possible to improve the durability of the driving lugs 9*a* and 9*b* by lowering the surface pressure of the driving lugs 9*a* and 9*b*. In addition, vibration during driving may be prevented, and it is possible to prevent the occurrence of cracks in the crawler body 1.

As shown by double-dashed line in FIG. 19, small-diameter rotating wheel portions 28*f* and 28*g* are installed on the flow rotating wheel 28. It is possible to make upper surfaces of the guide projections 8*a* and 8*b* as the wheel rolling portions (e.g., the head portions 81*a* and 81*b*) corresponding to the rotating wheel portions 28*f* and 28*g*. It is possible for the large-diameter rotating wheel portions 28*a* and 28*b* to roll over the wheel rolling portions 26*a* and 26*b*, and at the same time, to make the small-diameter rotating wheel portions 28*f* and 28*g* roll on the wheel rolling portions (e.g., the head portions 81*a* and 81*b*).

While exemplary embodiments have been described in detail, it is to be understood that it is not limited thereto, and various modifications are possible. For example, the driving lugs 9*a* and 9*b* and the connecting lugs 10*a* and 10*b* constituting the two rows of left and right lug rows 4*a* and 4*b* on the outer periphery of the crawler body 1 may be changed into an arc shape, a straight line shape, a curved shape, or other suitable shape in response to the conditions on the road side.

In addition, in arranging the driving lugs 9*a* and 9*b* so as to overlap the two adjacent steel cores 3, it is preferable to arrange the driving lugs 9*a* and 9*b* in a generally obliquely oblique shape with respect to the steel core 3. However, the driving lugs 9*a* and 9*b* may be arranged in a curved shape so as to meander over the two adjacent steel cores 3. In this case, it is also possible to omit the connecting lugs 10*a* and 10*b*.

It is preferable that the driving lugs 9*a* and 9*b* are arranged so as to overlap with two or more neighboring steel cores 3. In that case, it is preferable that some of the driving lugs 9*a* and 9*b* including the upper surface overlap the steel core 3. However, among the driving lugs 9*a* and 9*b* having a trapezoidal cross section, a portion of the driving lugs 9*a* and 9*b* other than the upper surfaces of the driving lugs 9*a* and 9*b*, such as the upper inclined portion thereof, may be possible. When the driving lugs 9*a* and 9*b* of each of the lug rows 4*a* and 4*b* are of one type, it is preferable that the driving lugs 9*a* and 9*b* overlap the steel core 3. However, when there are multiple types of driving lugs 9*a* and 9*b*, such as two types of driving lugs 9*a* and 9*b*, which are long and short, it is also possible to make all of the driving lugs 9*a* and 9*b* overlap at least two adjacent steel cores 3. It is also possible that some of a plurality types of driving lugs 9*a* and 9*b*, for example, main driving lugs 9*a* and 9*b*, overlap with the adjacent two steel core metals 3, and other driving lugs 9*a* and 9*b* overlap with one steel core 3.

The driving lugs 9*a* and 9*b* and the connecting lugs 10*a* and 10*b* may have substantially the same upper surface. However, when the upper surfaces of the driving lugs 9*a* and 9*b* are higher than the upper surfaces of the connecting lugs 10*a* and 10*b*, the erosion of the driving force on the ground is improved, and it is possible to increase the driving force.

In that case, the driving lugs 9a and 9b may have at least portions corresponding to the connecting lugs 10a and 10b high.

In the exemplary embodiments as described above, the elastic crawler includes a coupling hole 2 arranged at equal intervals in a circumferential direction in a center of a crawler body 1 in a left and right direction, a steel core 3 arranged in a width direction between the coupling holes 2 adjacent to the crawler body 1 in the circumferential direction, and two rows of left and right lugs 4a and 4b installed on an outer periphery of the crawler body 1. However, it is also possible to implement the same in an elastic crawler having a coupling portion protruding in an inner periphery in place of the coupling hole 2.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. An elastic crawler, comprising:
   a plurality of coupling portions arranged at equal intervals in a circumferential direction at a center in a width direction of a crawler body;
   a plurality of steel cores, each steel core formed in the width direction, the each steel core alternately arranged between two coupling portions, from among the plurality of coupling portions, adjacent in the circumferential direction of the crawler body; and
   two lug rows installed on an outer periphery of the crawler body at bath left and right sides of the plurality of coupling portions in the width direction,
   wherein each lug row comprises a plurality of driving lugs, each driving lug arranged in an oblique direction with respect to the steel core of the corresponding lug row, and a plurality of connecting lugs, each connecting lug configured to connect two driving lugs, from among the plurality of driving lugs, adjacent in the circumferential direction of the correspond lug row, and
   wherein the each driving lug of the each lug row has a length to straddle two steel cores adjacent in the circumferential direction, overlaps with one of the two adjacent steel cores in the circumferential direction at an overlapping portion on an inner end side close to the coupling portion, and overlaps with the other of the two adjacent steel cores in the circumferential direction at an overlapping portion on an outer end side far from the coupling portion,
   wherein the each connecting lug of the each lug row is arranged with an inclination in an opposite direction to the each driving lug of the corresponding lug row, and overlaps with one of the steel cores at an overlapping portion between the overlapping portion on the inner end side of one of the two adjacent driving lugs in the circumferential direction and the overlapping portion on the outer end side of the other of the two adjacent driving lugs in the circumferential direction.

2. The elastic crawler of claim 1, wherein the overlapping portion of the each connecting lug is continuous to the overlapping portion on the outer end side.

3. The elastic crawler of claim 2, wherein the each driving lug is curved in an arc shape having a convex side facing a forward direction.

4. The elastic crawler of claim 2, wherein the each driving lug is curved in an arc shape having a convex side facing a rearward direction.

5. The elastic crawler of claim 2, wherein the each driving lug has a substantially straight shape formed extending in the oblique direction.

6. The elastic crawler of claim 2, wherein an upper surface of the each connecting lug is lower than an upper surface of a connecting lug corresponding portion of the each driving lug corresponding to the each connecting lug.

7. The elastic crawler of claim 1, wherein each driving lug is curved in an arc shape having a convex side facing a forward direction.

8. The elastic crawler of claim 1, wherein the each driving lug is curved in an arc shape having a convex side facing a rearward direction.

9. The elastic crawler of claim 1, wherein the each driving lug has a substantially straight shape formed extending in the oblique direction.

10. The elastic crawler of claim 1, wherein an upper surface of the each connecting lug is lower than an upper surface of a connecting lug corresponding portion of the each driving lug corresponding to the each connecting lug.

11. The elastic crawler of claim 1, wherein the plurality of driving lugs in the lug row of the right side are arranged in a state shifted by half a pitch in a circumferential direction with respect the plurality of driving lugs in the lug row of the left side.

12. The elastic crawler of claim 1, where each driving lug has a shape in which, the each driving lug expands along the forward direction.

13. The elastic crawler of claim 1, where a recessed portion is provided between the each driving lug and the each connecting lug corresponding to the each driving lug.

* * * * *